US012288295B2

(12) United States Patent
Genova et al.

(10) Patent No.: US 12,288,295 B2
(45) Date of Patent: Apr. 29, 2025

(54) SYSTEMS AND METHODS FOR GENERATING SPLAT-BASED DIFFERENTIABLE TWO-DIMENSIONAL RENDERINGS

(71) Applicant: Google LLC, Mountain View, CA (US)

(72) Inventors: Kyle Adam Genova, San Mateo, CA (US); Daniel Vlasic, Cambridge, MA (US); Forrester H. Cole, Cambridge, MA (US)

(73) Assignee: GOOGLE LLC, Mountain View, CA (US)

( * ) Notice: Subject to any disclaimer, the term of this patent is extended or adjusted under 35 U.S.C. 154(b) by 66 days.

(21) Appl. No.: 18/014,307

(22) PCT Filed: Aug. 31, 2020

(86) PCT No.: PCT/US2020/048784
§ 371 (c)(1),
(2) Date: Jan. 3, 2023

(87) PCT Pub. No.: WO2022/046113
PCT Pub. Date: Mar. 3, 2022

(65) Prior Publication Data
US 2023/0298269 A1 Sep. 21, 2023

(51) Int. Cl.
G06T 17/20 (2006.01)
G06T 7/90 (2017.01)
(52) U.S. Cl.
CPC ............ G06T 17/20 (2013.01); G06T 7/90 (2017.01)

(58) Field of Classification Search
CPC ....... G06T 17/20; G06T 17/00; G06T 17/205; G06T 7/90; G06T 2210/56; G06T 5/60;
(Continued)

(56) References Cited

U.S. PATENT DOCUMENTS 7,133,041 B2* 11/2006 Kaufman ............... G06T 15/08
345/419
9,418,478 B2* 8/2016 Howard .................. G06T 17/20
(Continued)

OTHER PUBLICATIONS

International Preliminary Report on Patentability for Application No. PCT/US2020/048784, mailed Mar. 9, 2023, 8 pages.
(Continued)

Primary Examiner — Vijay Shankar
(74) Attorney, Agent, or Firm — DORITY & MANNING P.A.

(57) ABSTRACT

Systems and methods of the present disclosure are directed to a method that can include obtaining a 3D mesh comprising polygons and texture/shading data. The method can include rasterizing the 3D mesh to obtain a 2D raster comprising pixels and coordinates respectively associated with a subset of pixels. The method can include determining an initial color value for the subset of pixels based on the coordinates of the pixel and the associated shading/texture data. The method can include constructing a splat at the coordinates of a respective pixel. The method can include determining an updated color value for a respective pixel based on a weighting of the subset of splats to generate a 2D rendering of the 3D mesh based on the coordinates of a pixel and a splat.

20 Claims, 8 Drawing Sheets

(58) Field of Classification Search
CPC ....... G06T 15/04; G06T 15/005; G06T 15/80; G06T 15/205; G06T 15/00
See application file for complete search history.

(56) References Cited

U.S. PATENT DOCUMENTS

| | | | |
|---|---|---|---|
| 9,582,932 B2* | 2/2017 | van der Merwe | G06V 20/176 |
| 10,504,274 B2* | 12/2019 | Du | G06T 17/00 |
| 10,565,747 B2 | 2/2020 | Li et al. | |
| 10,681,325 B2 | 6/2020 | Kontkanen et al. | |
| 11,109,065 B2* | 8/2021 | Hemmer | H04N 19/42 |
| 2004/0125103 A1* | 7/2004 | Kaufman | G06T 15/08 |
| | | | 345/419 |
| 2019/0213778 A1* | 7/2019 | Du | G06T 15/04 |
| 2024/0096018 A1* | 3/2024 | Zhi | G06T 17/20 |
| 2024/0161406 A1* | 5/2024 | Mech | G06T 17/20 |

OTHER PUBLICATIONS

International Search Report for Application No. PCT/US2020/048784, mailed on Apr. 6, 2021, 2 pages.

Li, Tzu-Mao. "Differentiable Visual Computing", PhD Thesis, MIT, Jun. 15, 2019, Chapters 1,2,5 with subsections.

Loper, et al. "OpenDR: An Approximate Differentiable Renderer", "ICIAP: International Conference on Image Analysis and Processing, 17th International Conference, Naples, Italy, Sep. 9-13, 2013. Proceedings", Jan. 1, 2014 (Jan. 1, 2014), vol. 8695, pp. 154-169, 16 pages.

Yifan, et al. "Differentiable Surface Splatting for Point-based Geometry Processing", Cornell University, Ithaca, NY, arXiv:1906.04173v3, Sep. 3, 2019, 14 pages.

Machine Translated Chinese Search Report Corresponding to Application No. 202080104438.8 on Aug. 21, 2024.

* cited by examiner

SYSTEMS AND METHODS FOR GENERATING SPLAT-BASED DIFFERENTIABLE TWO-DIMENSIONAL RENDERINGS

PRIORITY CLAIM

This application is based upon and claims the right of priority under 35 U.S.C. § 371 to International Application No. PCT/US2020/048784 filed on Aug. 31, 2020, which is incorporated by reference herein.

FIELD

The present disclosure relates generally to differentiable rendering. More particularly, the present disclosure relates to splat-based differentiable rendering for accurate derivatives at occlusion boundaries.

BACKGROUND

In many industries, three-dimensional polygonal meshes are the predominant shape representation for three-dimensional modeling (e.g., graphics, computer vision, machine-learning, etc.). As such, the capacity to compute accurate derivatives of these meshes with respect to the underlying scene parameters is of increasing interest. However, a key difficulty in computing these derivatives is the discontinuity introduced by occlusion boundaries. Contemporary solutions to this problem (e.g., mesh processing, custom derivative calculations, etc.) have generally been found to be computationally expensive and/or difficult to implement.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for efficiently generating a differentiable two-dimensional rendering of a three-dimensional model. The method can include obtaining, by a computing system comprising one or more computing devices, a three-dimensional mesh comprising a plurality of polygons and at least one of associated texture data or associated shading data. The method can include rasterizing, by the computing system, the three-dimensional mesh to obtain a two-dimensional raster of the three-dimensional mesh, wherein the two-dimensional raster comprises a plurality of pixels and a plurality of coordinates respectively associated with at least a subset of pixels of the plurality of pixels, wherein the coordinates for each pixel in the subset of pixels describe a location of the respective pixel relative to vertices of a respective polygon of the plurality of polygons in which the pixel is located. The method can include determining, by the computing system, a respective initial color value for each pixel of the subset of pixels based at least in part on the coordinates of the pixel and the at least one of the associated shading data or the associated texture data. The method can include constructing, by the computing system for each of the subset of pixels, a splat at the coordinates of the respective pixel. The method can include determining, by the computing system for each of the subset of pixels, an updated color value for the respective pixel based on a weighting of each of a subset of the splats to generate a two-dimensional differentiable rendering of the three-dimensional mesh, wherein, for each of the subset of the splats, the weighting of the respective splat is based at least in part on the coordinates of the respective pixel and the coordinates of the respective splat.

Another example aspect of the present disclosure is directed to a computing system for efficiently generating a differentiable two-dimensional rendering of a three-dimensional model. The computing system can include one or more processors. The computing system can include one or more tangible, non-transitory computer readable media storing computer-readable instructions that when executed by the one or more processors cause the one or more processors to perform operations. The operations can include obtaining a three-dimensional mesh comprising a plurality of polygons and at least one of associated texture data or associated shading data. The operations can include rasterizing the three-dimensional mesh to obtain a two-dimensional raster of the three-dimensional mesh, wherein the two-dimensional raster comprises a plurality of pixels and a plurality of coordinates respectively associated with at least a subset of pixels of the plurality of pixels, wherein the coordinates for each pixel in the subset of pixels describe a location of the respective pixel relative to vertices of a respective polygon of the plurality of polygons in which the pixel is located. The operations can include determining a respective initial color value for each pixel of the subset of pixels based at least in part on the coordinates of the pixel and the at least one of the associated shading data or the associated texture data. The operations can include constructing, for each of the subset of pixels, a splat at the coordinates of the respective pixel. The operations can include determining, for each of the subset of pixels, an updated color value for the respective pixel based on a weighting of each of a subset of the splats to generate a two-dimensional differentiable rendering of the three-dimensional mesh, wherein, for each of the subset of the splats, the weighting of the respective splat is based at least in part on the coordinates of the respective pixel and the coordinates of the respective splat.

Another example embodiment of the present disclosure is directed to One or more tangible, non-transitory computer readable media storing computer-readable instructions that when executed by one or more processors cause the one or more processors to perform operations. The operations can include obtaining a three-dimensional mesh comprising a plurality of polygons and at least one of associated texture data or associated shading data. The operations can include rasterizing the three-dimensional mesh to obtain a two-dimensional raster of the three-dimensional mesh, wherein the two-dimensional raster comprises a plurality of pixels and a plurality of coordinates respectively associated with at least a subset of pixels of the plurality of pixels, wherein the coordinates for each pixel in the subset of pixels describe a location of the respective pixel relative to vertices of a respective polygon of the plurality of polygons in which the pixel is located. The operations can include determining a respective initial color value for each pixel of the subset of pixels based at least in part on the coordinates of the pixel and the at least one of the associated shading data or the associated texture data. The operations can include constructing, for each of the subset of pixels, a splat at the coordinates of the respective pixel. The operations can include determining, for each of the subset of pixels, an updated color value for the respective pixel based on a weighting of each of a subset of the splats to generate a two-dimensional differentiable rendering of the three-dimensional mesh, wherein, for each of the subset of the splats, the weighting of the respective splat is based at least in part on the coordinates of the respective pixel and the coordinates of the respective splat.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
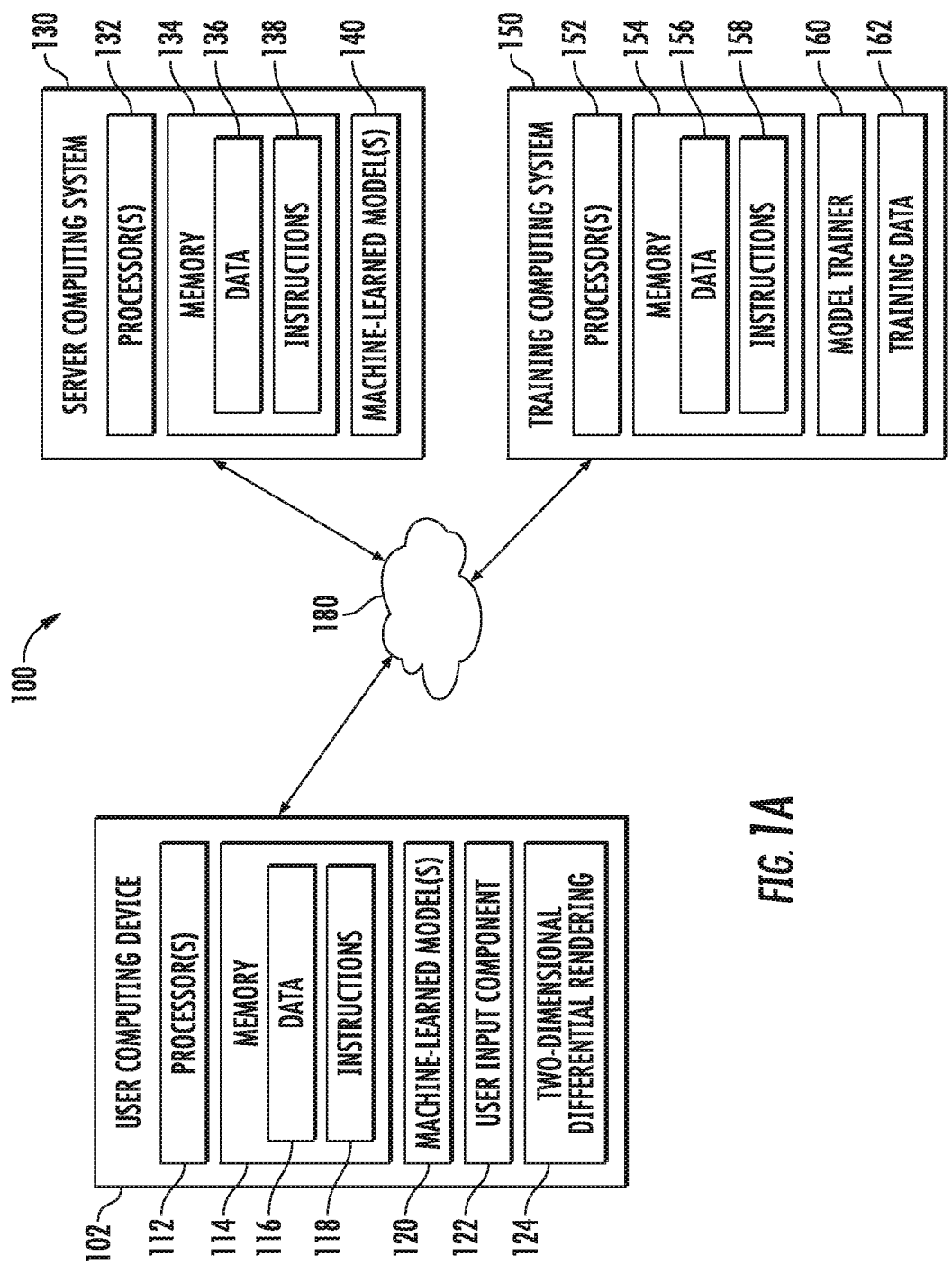
FIG. 1A depicts a block diagram of an example computing system that performs two-dimensional differentiable rendering according to example embodiments of the present disclosure.

Reference numerals that are repeated across plural figures are intended to identify the same features in various implementations.

DETAILED DESCRIPTION

Overview

Generally, the present disclosure is directed to differentiable rendering. More particularly, the present disclosure relates to splat-based forward rendering for three-dimensional meshes that generates smooth derivatives near occlusion boundaries of the mesh. As an example, a three-dimensional mesh can be obtained that includes a plurality of polygons alongside associated texture data and/or shading data. This three-dimensional mesh can be rasterized to generate a two-dimensional raster of the three-dimensional mesh (e.g., represented as a plurality of pixels, etc.). For a subset of pixels of the two-dimensional raster, coordinates can be generated that describe a location of each pixel relative to vertices of a respective polygon in which the pixel is located (e.g., barycentric coordinates, etc.). Based on the coordinates of the pixels, an initial color value can be determined for each pixel based on the coordinates of the pixel and the associated shading and/or texture data (e.g., a pixel located within a polygon that corresponds to a yellow shading can have an initial color value of yellow, etc.). Once colors are determined for the subset of pixels, a splat (e.g., a small area of color with smooth falloff, etc.) can be constructed for each pixel at the pixel's respective coordinates. An updated color value can be determined for each of the pixels based on a weighting of a subset of the previously constructed splats. For example, a splat constructed for a yellow pixel can "spread" the color of the yellow pixel to pixels adjacent to the yellow pixel based on the location of the splat (e.g., at the yellow pixel) and the adjacent pixels (e.g., a splat would be spread more strongly to a pixel that is one pixel away from the yellow pixel than a pixel five pixels away from the yellow pixel). By determining an updated color for each of the subset of pixels, a two-dimensional differentiable rendering of the three-dimensional mesh can be generated. Based on the two-dimensional differentiable rendering, derivative(s) can be generated for the splat(s) (e.g., based on the weighting of the splats with regard to the pixels, etc.). Thus, in such fashion, splats can be constructed and applied to a two-dimensional raster to generate a two-dimensional differentiable rendering of a three-dimensional mesh, therefore providing a source for smooth derivatives at any point of the two-dimensional rendering (e.g., at occlusion boundaries, etc.).

More particularly, a computing system can obtain a three-dimensional mesh. The three-dimensional mesh can be or otherwise include a plurality of polygons and associated texture data and/or associated shading data. As an example, the three-dimensional mesh can be a mesh representation of an object, and the associated shading and/or texture data can indicate a one or more colors for the polygons of the three-dimensional mesh (e.g., a texture data for a character model mesh in a video game, etc.). In some implementations, the three-dimensional mesh can be generated using one or more machine-learning techniques. As an example, the three-dimensional mesh may be generated by a machine-learned model based on a two-dimensional input. For example, a machine-learned model can process a two-dimensional image of a cup and can output a three-dimensional mesh representation of the cup.

As another example, the three-dimensional mesh can represent pose and/or orientation adjustments to a first three-dimensional mesh. For example, a machine-learned model can process a first three-dimensional mesh at a first pose and/or orientation and obtain a second three-dimensional mesh at a second pose and/or orientation different from the first. Thus, the three-dimensional mesh and the associated texture/shading data can, in some implementations, be an output of a machine-learned model, and as such, the capacity to generate smooth derivatives for a rendering of the three-dimensional mesh (e.g., at occlusion boundaries, etc.) can be necessary to optimize the machine-learned model used to generate the three-dimensional mesh.

The computing system can rasterize the three-dimensional mesh to obtain a two-dimensional raster of the three-dimensional mesh. The two-dimensional raster can be or otherwise include a plurality of pixels and a plurality of coordinates respectively associated with a subset of the plurality of pixels (e.g., by sampling the surface of the three-dimensional mesh, etc.). These coordinates can describe the locations of pixels relative to the vertices of the polygons in which the pixels are located. As an example, a first coordinate can describe a location of a first pixel relative to the vertices of a first polygon in which the first pixel is located. A second coordinate can describe a location of a second pixel relative to the vertices of a second polygon in which the second pixel is located. In some implementations, each of the plurality of coordinates can be or otherwise include barycentric coordinates.

In some implementations, the two-dimensional raster can also include a plurality of polygon identifiers for each of the subset of pixels. The polygon identifiers can be configured to identify, for each pixel, one or more polygons that a respective pixel is located within. As an example, a pixel can be located within two or more overlapping polygons of the plurality of polygons (e.g., as the polygons of the three-dimensional mesh are represented in two dimensions, etc.). The polygon identifier for the pixel would identify that the pixel is located within both polygons. Additionally, in some implementations, the polygon identifier can identify a front-facing polygon when a pixel is located within two or more overlapping polygons. As an example, the three-dimensional mesh can represent a cube. A pixel of the two-dimensional raster of the three-dimensional mesh can be located inside a polygon of a first side of the cube and a non-visible (e.g., from two dimensions) polygon on an opposite side of the cube. The polygon identifier can indicate that the polygon on the first side of the cube is the front-facing polygon. In such fashion, the polygon identifier can be utilized to ensure that a color applied to the pixel is associated with the polygon facing the viewpoint of the two-dimensional raster.

It should be noted that the computing system can rasterize the three-dimensional mesh to obtain the two-dimensional raster using any type of rasterization scheme. As an example, the two-dimensional raster (e.g., the plurality of coordinates, the polygon identifiers, etc.) may be obtained using a conventional z-buffer graphics processing (e.g., depth buffering, etc.). As another example, the two-dimensional raster (e.g., the plurality of coordinates, the polygon identifiers, etc.) may be obtained using a three-dimensional raycasting procedure. As such, embodiments of the present disclosure can be utilized in a rendering and/or rasterization pipeline without requiring the use of a non-standard or unique rasterization scheme.

The computing system can determine an initial color value for each pixel of the subset of pixels. The initial color value can be based on the coordinates of the pixel and the associated shading data and/or the associated texture data. As an example, the polygon coordinates for a first pixel can indicate that the first pixel is located in a first polygon. Based on the shading and/or texture data, the polygon can be determined to have an orange color where the pixel is located (e.g., with respect to the polygon's vertices, etc.). The first pixel can be colored orange based on the pixel coordinates and the shading and/or texture data.

More particularly, in some implementations, the polygon identifier and coordinates for each pixel can allow for perspective-correct interpolation of vertex attributes (e.g., of the polygons of the three-dimensional mesh, etc.) to determine a color for the pixel. In some implementations, the determination of the color for each pixel can include application of the shading data and/or the texture data to the two-dimensional raster using a shading and/or texturing scheme. For either application, any sort of application scheme can be used. As an example, a deferred-shading, image-space application scheme can be used to apply the shading data and/or the texture data to determine a color for each of the subset of pixels.

The computing system can construct a splat for each pixel of the subset of pixels at the coordinates of each of the respective pixels. More particularly, each rasterized surface point of the two-dimensional raster can be converted into a splat, centered at the coordinates of the respective pixel, and colored by the corresponding shaded color C that was determined for the pixel. In some implementations, a splat can be constructed as a small area of color with a smooth falloff of color that spreads out from the origin of the splat. As an example, the color of a splat with a bright red center location may smoothly fall off as the distance from the center of the splat grows further (e.g., a gradient from the edge of the splat to the center of the splat, etc.).

To preserve derivatives for the vertices of the polygons of the three-dimensional mesh, the coordinates at which the splats are constructed (e.g., splat center points, etc.) can be computed by interpolating clip-space vertex positions for the polygon in which a respective pixel is located based at least in part on the coordinates associated with the pixel (e.g., x, y, z, w homogeneous coordinates, barycentric coordinates, etc.). As an example, a h×w×4 buffer of per-pixel clip-space positions V can be formed for each pixel. Perspective division and a viewport transformation can be applied to the buffer to produce a h×w×2 screen-space splat position buffer S. For example, if s is a position of a single splat, the weight of the splat at a pixel p in the image is:

$$w_s(p) = \frac{1}{W} \exp\left(\frac{-\|p-s\|_2^2}{2\sigma^2}\right)$$

where W normalizes by the sum of all weights for the splat (see below). The final color $r_p$ at pixel p can then represent the weighted sum of the shaded colors $c_q$ of the neighboring pixels $q \in N_p$.

The computing system can determine an updated color value for each of the subset of pixels to generate a two-dimensional differentiable rendering of the three-dimensional mesh. The updated color value can be based on a weighting of a subset of the constructed splats. The weighting of the respective splats in the subset of splats for a pixel can be based at least in part on the coordinates of the respective pixel and the coordinates of the respective splat. As an example, a first pixel can have a determined color of yellow. Coordinates of a second pixel can be located a certain distance away from the first pixel, and a third pixel can be located an even further distance from the first pixel. The application of the first pixel splat (e.g., constructed at the coordinates of the first pixel, etc.) to the second pixel can be weighted more heavily than the application of the first pixel splat to the third pixel, as the second pixel is located closer to the first pixel than the third pixel is. As such, the weighting of the subset of splats in the determination of an updated color value for a pixel can be based on the proximity of each of the splats to the pixel. By determining the updated color values for each of the subset of splats, a differentiable two-dimensional rendering of the three-dimensional mesh can be generated. As such, the differentiable two-dimensional rendering (e.g., generated through application of the splats, etc.) can be utilized to find smooth derivatives at occlusion boundaries of the rendering.

It should be noted that the subset of splats can, in some implementations, include fewer splats than the number of constructed splats. Additionally, in some implementations, a subset of splats can be selected uniquely for each pixel of the subset of pixels. As an example, the subset of splats for a pixel can include only the splats constructed for pixels adjacent to the pixel. As another example, the subset of splats for a pixel can include only the splats constructed for pixels within a certain distance or area of the pixel (e.g., a 5×5 pixel area around the pixel, a certain distance as defined by pixel coordinates, etc.). Alternatively, in some implementations, the subset of splats can include each of the splats constructed for the subset of pixels. As an example, for the determination of an updated color value for a single pixel, each of the splats constructed can be weighed (e.g., a normalized weight from 0.0-1.0, etc.). For example, each splat can be weighed for a pixel based on the distance of the splat from the pixel, and splats closest to the pixel can be weighed most heavily while splats furthest from the pixel can be weighed the least.

As an example, s can be the position of a single splat. P can be a pixel in the two-dimensional raster. The weight of the splat at a pixel p in the two-dimensional raster can be defined as:

$$w_s(p) = \frac{1}{W}\exp\left(\frac{-\|p-s\|_2^2}{2\sigma^2}\right)$$

where W can be normalized by the sum of all weights for the splat (see below). The updated color value $r_p$ for pixel p can be the weighted sum of the shaded initial color values $c_q$ of the neighboring pixels $q \in N_p$:

$$r_p = \sum_{q \in N_p} w_q(p) c_q$$

As described previously, in some implementations a subset of neighboring (e.g., adjacent, a certain distance away, etc.) can be used. For example, a 3×3 pixel neighborhood can be used with σ=0.5, which can yield the normalization factor:

$$W = \sum_{i=-1}^{1} \sum_{j=-1}^{1} \exp(-2\|\lfloor s \rfloor + (i, j) - s\|_2^2)$$

It should be noted that unlike point-based rendering, where the splats themselves are the representation of the surface of the three-dimensional mesh, the splats of the present disclosure are sampled from the underlying mesh at exactly pixel-rate. As such, the splat radius can be fixed in screen-space, and the normalization factor can be constant per-splat, therefore avoiding the need to create an artificial gradient that is robust to per-pixel weight normalization.

In some implementations, the computing system can generate, based on the two-dimensional differentiable rendering, one or more derivatives for one or more respective splats of the two-dimensional rendering (e.g., at occlusion boundaries, etc.). More particularly, one or more derivatives can, be generated for the weight(s) of one or more splats of the two-dimensional differentiable rendering with regards the vertex positions (e.g., using an automatic differentiation function, etc.). The generation of derivative(s) for splat(s) will be discussed in greater detail with regards to FIG. 2.

In some implementations, the two-dimensional differentiable rendering of the three-dimensional mesh can be processed with a machine-learned model to generate a machine-learned output (e.g., a depiction of the mesh at a second pose/orientation, a second three-dimensional mesh, a mesh fitting, a pose estimation, etc.).

In some implementations, a loss function can be evaluated that evaluates a difference between the machine-learned output and training data associated with the three-dimensional mesh based at least in part on the one or more derivatives. As an example, using a gradient descent algorithm, the one or more derivatives can be evaluated to determine a difference between the machine-learned output and the training data associated with the three-dimensional mesh (e.g., a ground truth associated with the three-dimensional mesh, etc.). Based on the loss function, one or more parameters of a machine-learned model can be adjusted.

As an example, the machine-learned model can be or otherwise include a machine-learned pose estimation model, and the machine-learned output can include image data that depicts an entity represented by the three-dimensional mesh (e.g., an object, at least a portion of a human body, a surface, etc.). The machine-learned output can be image data (e.g., a three-dimensional mesh, a two-dimensional differentiable rendering, etc.) that depicts the entity with at least one of a second pose or second orientation that are different than a first pose and/or orientation of the entity (e.g., as represented by the three-dimensional mesh, etc.).

As another example, the machine-learned model can be a machine-learned three-dimensional mesh generation model (e.g., a model configured to fit a mesh to a depicted entity, generate a mesh from two-dimensional image data, etc.). The machine-learned model can process the two-dimensional differentiable rendering to generate a second three-dimensional mesh. In such fashion, the two-dimensional differentiable rendering can allow for training of any type or configuration of machine-learned model(s) through differentiation of the machine-learned output of the model(s).

It should be noted that while the two-dimensional differential rendering generated by construction of splats can resemble a blurred or anti-aliased version of the two-dimensional raster, simply rasterizing and then blurring (even with arbitrary supersampling) is not sufficient to generate non-zero derivatives $\partial w(p)/\partial v_1$. More particularly, rasterization alone generally produces zero derivatives with regards to the vertices at any sampling rate, and therefore a blurred result will lack the capacity to generate non-zero derivatives (e.g., capable of differentiation, etc.).

The present disclosure provides a number of technical effects and benefits. As one example technical effect and benefit, the systems and methods of the present disclosure enable the generation of a differentiable two-dimensional rendering of a three-dimensional mesh that provides smooth derivatives at occlusion boundaries. As an example, contemporary differentiable rendering techniques are often computationally expensive and/or fail to produce accurate derivatives at the occlusion boundaries of the rendering. As such, the present disclosure provides methods to construct splats at the locations of pixels of the two-dimensional differentiable rendering. As the construction of splats is computationally efficient, the present disclosure provides systems and methods that significantly reduce the amount of computational resources (e.g., electricity, memory, instruction cycles, storage space, etc.) required to generate differentiable renderings. Additionally, the construction of splats provides accurate and simple derivatives at occlusion boundaries of the two-dimensional rendering, therefore significantly optimizing the performance of operations that require differentiable rendering (e.g., machine-learned model training, model alignment, pose estimation, mesh fitting, etc.). In such fashion, systems and methods of the present disclosure can be utilized to generate a two-dimensional differentiable rendering of a three-dimensional mesh that is both more computationally efficient and more accurate than conventional methods.

With reference now to the Figures, example embodiments of the present disclosure will be discussed in further detail.

Example Devices and Systems

FIG. 1A depicts a block diagram of an example computing system 100 that performs two-dimensional differentiable rendering according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

As an example, the instructions 118 can be executed to perform operations to generate a two-dimensional differentiable rendering 124. More particularly, the user computing device 102 can obtain a three-dimensional mesh that includes a plurality of polygons alongside associated texture data and/or shading data (e.g., from one or more machine-learned model(s) 120, via network 180, from computing system(s) 130 and/or 150, etc.). The user computing device 102 can rasterize the three-dimensional mesh to generate a two-dimensional raster of the three-dimensional mesh. For a subset of pixels of the two-dimensional raster, the user computing device 102 can generate coordinates that describe a location of each pixel relative to vertices of a respective polygon in which the pixel is located. Based on the coordinates of the pixels, the user computing device 102 can determine an initial color value for each pixel based on the coordinates of the pixel and the associated shading and/or texture data. The user computing device 102 can construct a splat for each pixel at the pixel's respective coordinates (e.g., based at least in part on the initial color value of the pixel, etc.). The user computing device 102 can determine an updated color value for each of the pixels based on a weighting of a subset of the previously constructed splats. By determining an updated color for each of the subset of pixels, the user computing device 102 can generate the two-dimensional differentiable rendering 124 of the three-dimensional mesh. Based on the two-dimensional differentiable rendering, the user computing device 102 can generate derivative(s) for the splat(s) (e.g., based on the weighting of the splats with regard to the pixels, etc.). In such fashion, the user computing device 102 can execute the instructions 118 to perform operations configured to generate the two-dimensional differentiable rendering 124 from a three-dimensional mesh. The generation of the two-dimensional differentiable rendering 124 will be discussed in greater detail with regards to FIGS. 3A and 3B.

It should be noted that, in some implementations, the operations described previously with regards to the instructions 118 can also be included in the instructions 138 of the server computing system 130 and the instructions 158 at the training computing system 150. As such, any computing device and/or system can be configured to execute instructions to perform operations configured to generate a two-dimensional differentiable rendering from a three-dimensional mesh in accordance with example embodiments of the present disclosure.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel operations across multiple instances of the machine-learned models 120).

More particularly, the machine-learned models 120 can be or otherwise include one or more machine-learned models 120 that were trained based on processing of the two-dimensional differentiable rendering of a three-dimensional mesh generated using example embodiments of the present disclosure. As an example, the machine-learned model 120 can be a machine-learned model (e.g., a pose estimation model, a mesh fitting model, a mesh alignment model, etc.) trained based at least in part on processing the two-dimensional differentiable rendering to obtain a machine-learned output, and then evaluating a loss function that evaluates the machine-learned output and a ground truth using a gradient descent algorithm (e.g., at the user computing device 102, at the server computing system 130, at the training computing system 150, etc.). As another example, the machine-learned model 120 can be a machine-learned model trained based at least in part by evaluating a loss function that evaluates difference(s) between derivative(s) generated at occlusion boundaries of a two-dimensional differentiable rendering and training data associated with the three-dimensional mesh. It should be noted that the machine-learned model(s) 120 can perform any function that can be evaluated based at least in part on the differentiation of a two-dimensional differentiable rendering.

Additionally, or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a pose estimation service, a three-dimensional mesh generation service, a pose estimation service, etc.). Thus, one or more machine-learned models 120 can be stored and implemented at the user computing device 102 and/or one or more machine-learned models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the model(s) 140 can be or can otherwise include various machine-learned models. Example machine-learned models include neural networks or other multi-layer non-linear models. Example neural networks include feed forward neural networks, deep neural networks, recurrent neural networks, and convolutional neural networks. The machine-learned model(s) can be the same machine-learned model(s) as machine-learned model(s) 120, and can be trained in the same fashion (e.g., based on a two-dimensional differentiable rendering 124, etc.).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the models 120 and/or 140 based on a set of training data 162. The training data 162 can include, for example, a ground truth data associated with three-dimensional mesh. As an example, the training data 162 can include ground truth data for an entity (e.g., an estimated pose of the entity and/or an estimated orientation of the entity, etc.) represented by the three-dimensional mesh (e.g., an object, at least a portion of a human body, a surface, etc.). As an example, the machine-learned model(s) (e.g., machine-learned model(s) 120 and 140) can be or otherwise include a machine-learned pose estimation model. The machine-learned pose estimation model 120/140 can receive the training data 162 that includes a first pose and/or a first orientation of the entity represented by the three-dimensional mesh, and can output image data (e.g., a second three-dimensional mesh, a two-dimensional rendering, etc.) that depicts the entity at a second pose and/or second orientation. A loss function can be evaluated by the training computing system 150 that evaluates a difference between the image data and the ground truth data describing the first pose and/or orientation that is included in training data 162.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
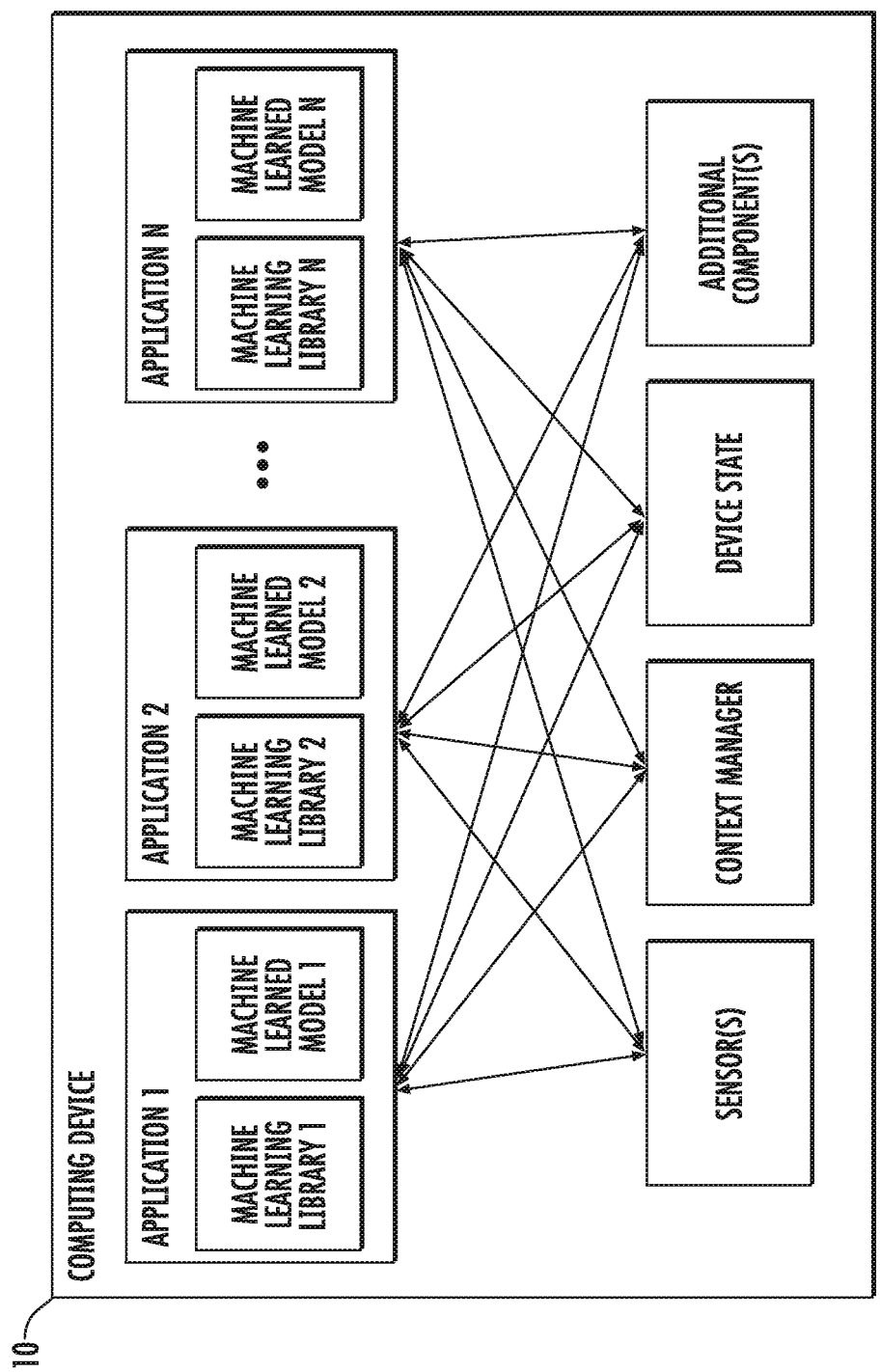
FIG. 1B depicts a block diagram of an example computing device that performs training of machine-learned model(s) based on a two-dimensional differentiable rendering according to example embodiments of the present disclosure.

FIG. 1B depicts a block diagram of an example computing device 10 that performs training of machine-learned model(s) based on a two-dimensional differentiable rendering according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
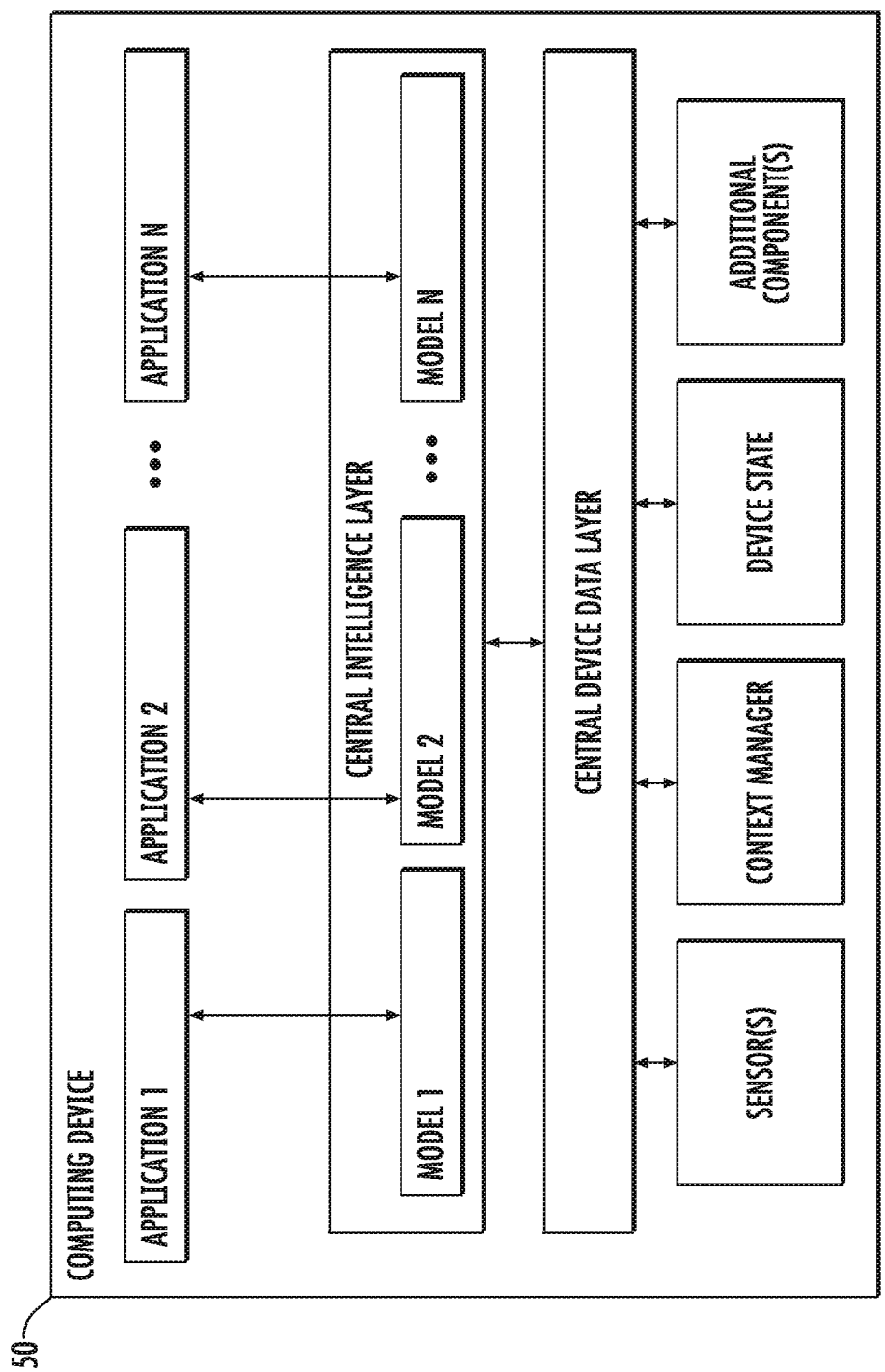
FIG. 1C depicts a block diagram of an example computing device that performs two-dimensional differentiable rendering according to example embodiments of the present disclosure.

FIG. 1C depicts a block diagram of an example computing device 50 that performs two-dimensional differentiable rendering according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
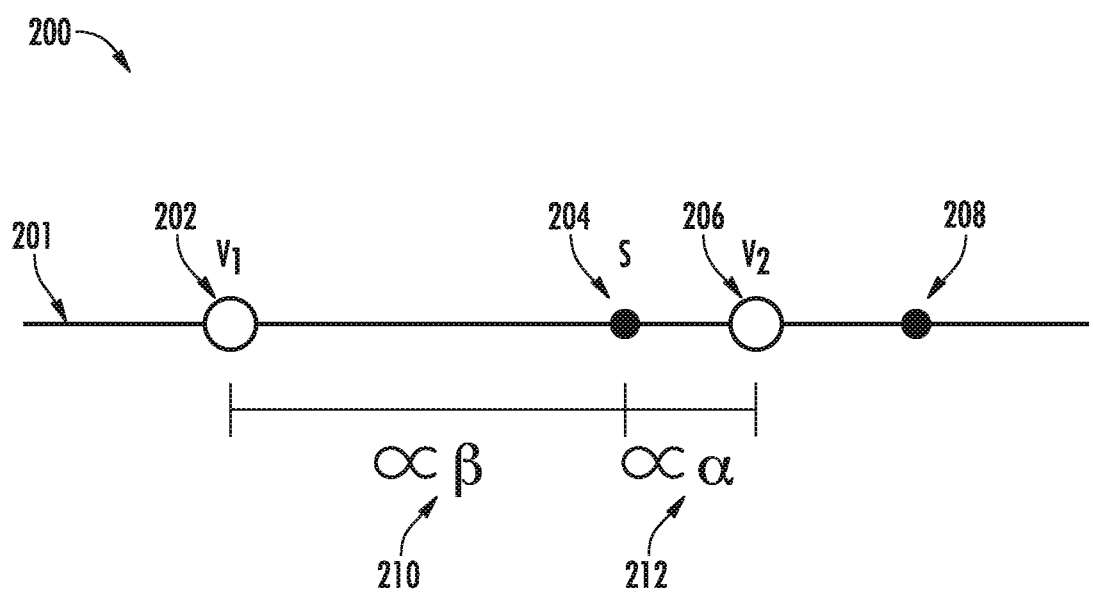
FIG. 2 depicts an illustrative example of splat construction for a one-dimensional line segment according to example embodiments of the present disclosure.

FIG. 2 depicts an illustrative example 200 of splat construction for a one-dimensional line segment 201 according to example embodiments of the present disclosure. It should be noted that FIG. 2 depicts the example construction of a splat 204 for a pixel 208 on a one-dimensional line segment 201 to more easily illustrate the construction of splats for a two-dimensional raster. As such, a one-dimensional line segment 201 can be analogous to a two-dimensional polygon (e.g., of a three-dimensional mesh, etc.), and the construction of a splat 204 for a one-dimensional line segment 201 can be the same or substantially similar to the construction of a splat for a two-dimensional polygon.

As an example, a line segment 201 can include a first vertex 202 and a second vertex 206. A splat can be constructed at splat position 204 for a pixel located at pixel position 208. More particularly, barycentric coordinate α 212 and barycentric coordinate β 210 can be the 1-D barycentric coordinates of splat position s 204 along the line segment 201. As such, splat position s 204 can be defined as:

$$s = \alpha v_1 + \beta v_2$$

in which α can represent barycentric coordinate 212, $v_1$ can represent vertex 202, $v_2$ can represent vertex 206, and β can represent barycentric coordinate 210. As described previously, the pixel at pixel position 208 can be updated (e.g., an updated color value, etc.) based at least in part on a weight w(p) of the splat at splat position 204. More particularly, the weight w(p) can represent the weight of the splat as applied to the pixel at pixel position 208, and can be weighted based at least in part on the difference between the location of the splat position 204 and the pixel position 208. As such, substituting the above for s 204 when computing the weight w(p) (and omitting normalization and σ factors for simplicity) can give:

$$w(p) = \exp(-(p - \alpha v_1 - \beta v_2)^2).$$

After constructing the splat, a derivative can be generated from the splat based at least in part on the coordinates (e.g., 210 and/or 212) of the splat with regards to the line segment and/or the pixel. As the barycentric coordinates α 212 and β 210 are generally not differentiable and can be considered constant, the derivative of the weight of the splat to the pixel w(p) with regards to $v_1$ can be defined as:

$$\frac{\partial w(p)}{\partial v_1} = 2\alpha(p - \alpha v_1 - \beta v_2)\exp(-(p - \alpha v_1 - \beta v_2)^2)$$

The exponential term and barycentric coordinate α 212 can be positive, so the sign of the derivative can be determined by the sign of $p - \alpha v_1 - \beta v_2$ or p−s. As such, increasing a distance of vertex $v_1$ 202 along the line segment 201 in a certain direction will increase the weight w(p) of the splat as applied to the pixel 208.

As an example, if the pixel position 208 is positioned to the right of the splat 204 on the line segment 201 (e.g., p>s, etc.) the weight w(p) of the splat 204 with respect to the pixel at position 208 can increase. Similarly, the weight w(p) of the splat 204 with respect to the pixel can decrease if the pixel position 208 is positioned to the right of the splat 204 on the line segment 201 (e.g., p<s, etc.). A derivative can be generated with respect to $v_2$ in a similar manner. In such fashion, a splat 204 can be constructed for a pixel 208, and can be utilized to generate derivatives based at least in part on the location of the splat.

Figure 3A:
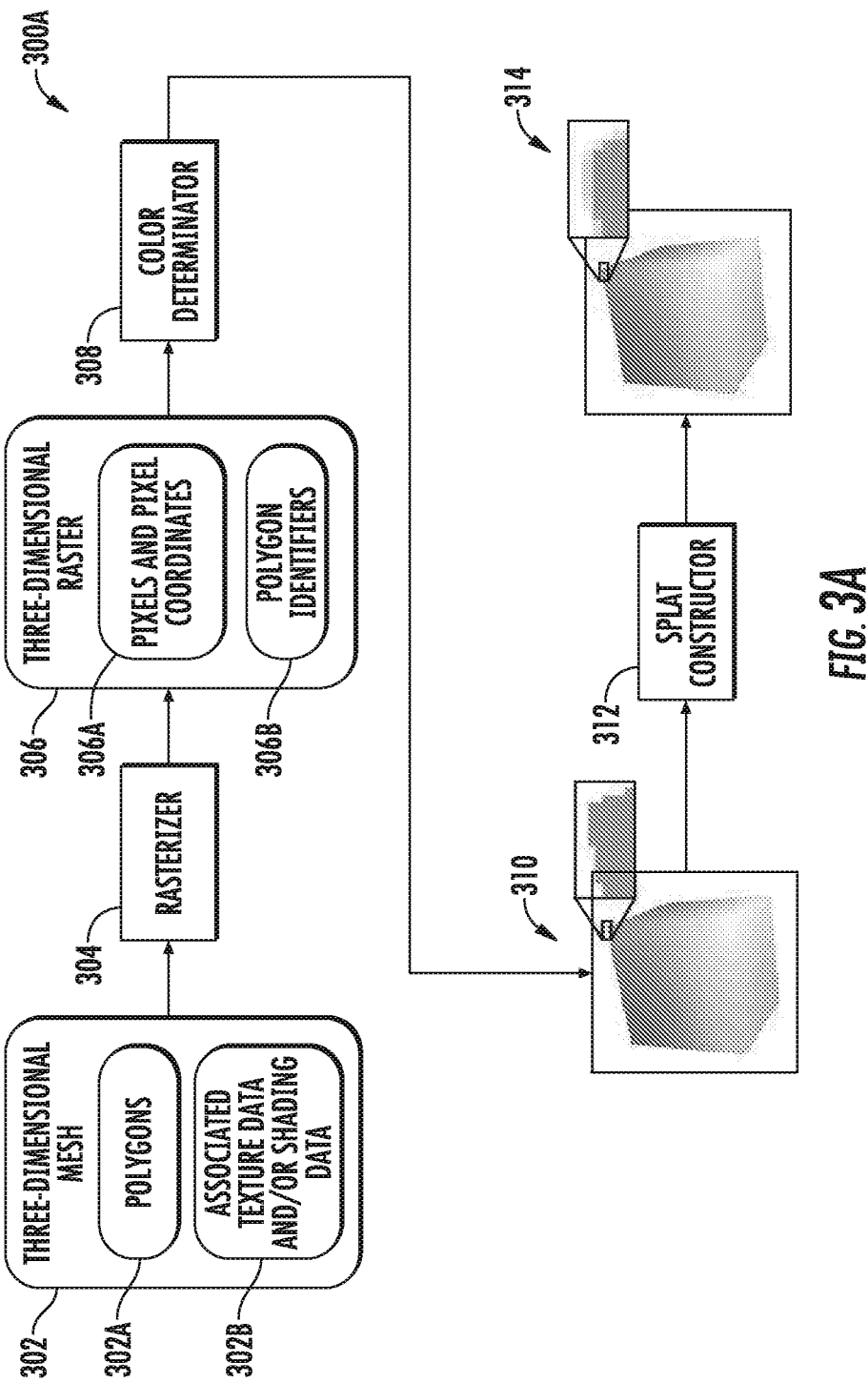
FIG. 3A depicts a data flow diagram of an example method for generating a two-dimensional differentiable rendering according to example embodiments of the present disclosure.

FIG. 3A depicts a data flow diagram of an example method 300A for generating a two-dimensional differentiable rendering according to example embodiments of the present disclosure. More particularly, a three-dimensional mesh 302 can be obtained. The three-dimensional mesh 302 can be or otherwise include a plurality of polygons 302A and associated texture data and/or associated shading data 302B. As an example, the three-dimensional mesh 302 can be a mesh representation of an object, and the associated shading and/or texture data 302B can indicate a one or more colors for the polygons of the three-dimensional mesh 302 (e.g., a texture data for a character model mesh in a video game, etc.). In some implementations, the three-dimensional mesh 302 can be generated using one or more machine-learning techniques. As an example, the three-dimensional mesh 302 may be generated by a machine-learned model (e.g., machine-learned model 326 of FIG. 3B, etc.) based on an input.

The three-dimensional mesh 302 can be rasterized by the rasterizer 304 (e.g., a component of a computing system, one or more operations performed by a computing system, etc.) to obtain a two-dimensional raster 306 of the three-dimensional mesh 302. The two-dimensional raster 306 can be or otherwise include a plurality of pixels and a plurality of coordinates respectively associated with a subset of the plurality of pixels 306. These coordinates can describe the locations of pixels relative to the vertices of the polygons 302A in which the pixels 306 are located. As an example, a first coordinate of pixels/coordinates 306A can describe a location of a first pixel relative to the vertices of a first polygon of the polygons 302A in which the first pixel is located. A second coordinate of the pixels/coordinates 306A can describe a location of a second pixel relative to the vertices of a second polygon of the polygons 302A in which the second pixel is located. In some implementations, each of the plurality of coordinates of pixels/coordinates 306A can be or otherwise include barycentric coordinates.

The two-dimensional raster 306 can also include a plurality of polygon identifiers 306B for each of the subset of pixels of pixels/coordinates 306A. The polygon identifiers 306B can be configured to identify, for each pixel 306A, one or more polygons 302A that a respective pixel is located within. As an example, a pixel of pixels/coordinates 306A can be located within two or more overlapping polygons of the plurality of polygons 302A (e.g., as the polygons of the three-dimensional mesh are represented in two dimensions, etc.). The polygon identifier 306B for the pixel 306A would identify that the pixel 306A is located within both polygons 302A. Additionally, in some implementations, the polygon identifier 306B can identify a front-facing polygon 302A when a pixel of the pixels 306A is located within two or more overlapping polygons of the polygons 302A. As an example, the three-dimensional mesh 302 can represent a cube. A pixel 302A of the two-dimensional raster 306 of the three-dimensional mesh 302 can be located inside a polygon 302A of a first side of the cube and a non-visible (e.g., from two dimensions) polygon 302A on an opposite side of the cube. The polygon identifier 306B can indicate that the polygon 302A on the first side of the cube is the front-facing polygon. In such fashion, a polygon identifier 306B can be utilized to ensure that a color applied to a pixel is associated with the polygon 302A facing the viewpoint of the two-dimensional raster 306.

It should be noted that the rasterizer 304 can be utilize any type of rasterization scheme to rasterize the three-dimensional mesh to obtain the two-dimensional raster. As an example, the two-dimensional raster 306 (e.g., the plurality of pixels/coordinates 306A, the polygon identifiers 306B, etc.) may be obtained by the rasterizer 304 using a conventional z-buffer graphics processing (e.g., depth buffering, etc.). As another example, the two-dimensional raster 306 may be obtained by the rasterizer 304 using a three-dimensional raycasting procedure. As such, embodiments of the present disclosure can be utilized in a rendering and/or rasterization pipeline without requiring the use of a non-standard or unique rasterization scheme.

A color determinator 308 (e.g., a component of a computing system, one or more operations performed by a computing system, etc.) can determine initial color values 310 for each pixel of the subset of pixels 306A. The initial color value 310 can be based on the coordinates of the pixel and the associated shading data and/or the associated texture data 302B. As an example, the polygon coordinates 306A for a first pixel can indicate that the first pixel is located in a first polygon of the polygons 302A. Based on the shading and/or texture data 302B, the color determinator 308 can determine that the polygon is to have an orange color where the pixel is located (e.g., with respect to the polygon's vertices, etc.). The first pixel can be colored orange based on the pixel coordinates 306A and the associated shading and/or texture data 302B.

More particularly, in some implementations, the polygon identifiers 306B and coordinates for each pixel 306A can allow for perspective-correct interpolation of vertex attributes by the color determinator 308 (e.g., of the polygons 302A of the three-dimensional mesh 302, etc.) to determine a color for the pixel. In some implementations, the determination of the color for each pixel by the color determinator 308 can include application of the shading data and/or the texture data 302B to the two-dimensional raster 306 using a shading and/or texturing scheme. For either application, any sort of application scheme can be used by the color determinator 308. As an example, a deferred-shading, image-space application scheme can be used by the color determinator 308 to apply the shading data and/or the texture data 302B and therefore to determine the initial color values 310 for the pixels 306A.

A splat constructor 312 (e.g., a component of a computing system, one or more operations performed by a computing system, etc.) can construct a splat for each pixel of the subset of pixels 306A at the coordinates of each of the respective pixels. More particularly, each rasterized surface point of the two-dimensional raster 306 can be converted into a splat by the splat constructor 312, centered at the coordinates of the respective pixel, and colored by the corresponding shaded color C of the initial color values 310. To preserve derivatives for the vertices of the polygons 302A of the three-dimensional mesh 302, the coordinates at which the splats are constructed (e.g., splat center points, etc.) can be computed by interpolating clip-space vertex positions for the polygon in which a respective pixel is located based at least in part on the coordinates associated with the pixel 306A (e.g., x, y, z, w homogeneous coordinates, barycentric coordinates, etc.). As an example, a h×w×4 buffer of per-pixel clip-space positions V can be formed for each pixel of the pixels/coordinates 306A. Perspective division and a viewport transformation can be applied by the splat constructor 312 to the buffer to produce a h×w×2 screen-space splat position buffer S. For example, if s is a position of a single splat, the weight of the splat at a pixel p in the image is:

$$w_s(p) = \frac{1}{w} \exp\left(\frac{-\|p-s\|_2^2}{2\sigma^2}\right)$$

where W normalizes by the sum of all weights for the splat (see below). The final color $r_p$ at pixel p is then the weighted sum of the shaded colors $c_q$ of the neighboring pixels $q \in N_p$:

Based on the constructed splats, an updated color value can be determined for each of the subset of pixels of the pixels/coordinates 306A to generate a two-dimensional differentiable rendering 314 of the three-dimensional mesh 302. The updated color value can be based on a weighting of a subset of the splats constructed by the splat constructor 312 (e.g., a subset of splats located near a pixel, etc.). The weighting of the respective splats in the subset of splats for a pixel can be based at least in part on the coordinates of the respective pixel and the coordinates of the respective splat. As an example, a first pixel of the pixels/coordinates 306A can have a determined color of yellow. Coordinates of a second pixel of the pixels/coordinates 306A can be located a certain distance away from the first pixel, and a third pixel of the pixels/coordinates 306A can be located an even further distance from the first pixel. The application of the first pixel splat (e.g., constructed at the coordinates of the first pixel by the splat constructor 312, etc.) to the second pixel can be weighted more heavily than the application of the first pixel splat to the third pixel, as the second pixel is located closer to the first pixel than the third pixel is. As such, the weighting of the subset of splats in the determination of an updated color value for a pixel can be based on the proximity of each of the splats to the pixel. By determining the updated color values for each of the subset of splats, the differentiable two-dimensional rendering 314 of the three-dimensional mesh 302 can be generated. As such, the differentiable two-dimensional rendering 314 (e.g., generated through application of the splats, etc.) can be utilized to find smooth derivatives at occlusion boundaries of the rendering.

It should be noted that while the two-dimensional differential rendering 314 generated by construction of splats at the splat constructor 312 can resemble a blurred or anti-aliased version of the two-dimensional raster 306, simply rasterizing and then blurring the two-dimensional raster 306 (e.g., with arbitrary supersampling, etc.) is not sufficient to generate non-zero derivatives $\partial w(p)/\partial v_1$. More particularly, rasterization alone generally produces zero derivatives with regards to the vertices at any sampling rate, and therefore a blurred result will lack the capacity to generate non-zero derivatives (e.g., capable of differentiation, etc.).

Figure 3B:
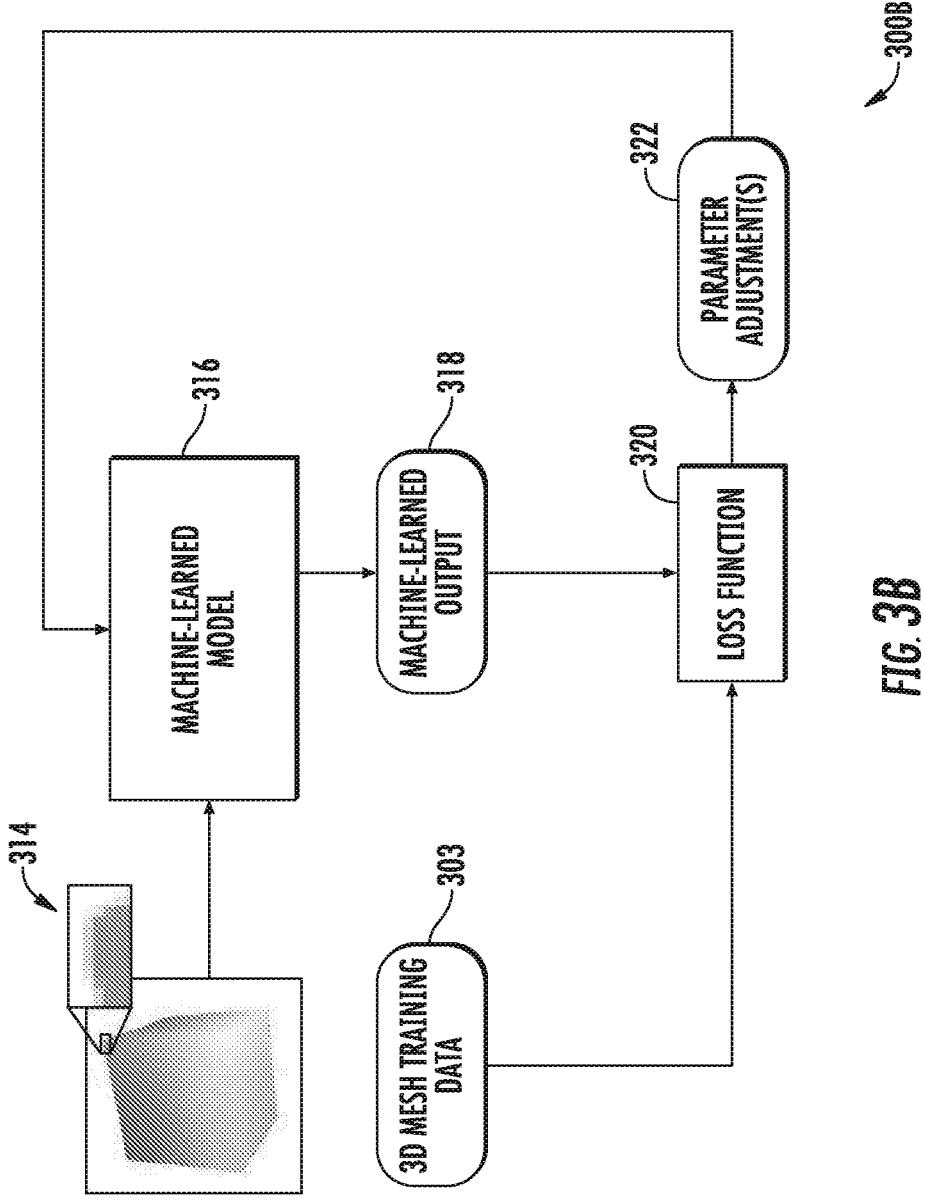
FIG. 3B depicts a data flow diagram of an example method for generating derivatives from a two-dimensional differentiable rendering to train a machine-learned model according to example embodiments of the present disclosure.

FIG. 3B depicts a data flow diagram of an example method 300B for training a machine-learned model using the two-dimensional differentiable rendering according to example embodiments of the present disclosure. The two-dimensional differentiable rendering 314 can be obtained alongside 3D mesh training data 303. The 3D mesh training data 303 can be or otherwise include ground truth data associated with some aspect of the three-dimensional mesh 302. As an example, the three-dimensional mesh 302 may be generated by a machine-learned model based on two-dimensional input data (e.g., a model generation network, etc.). The 3D mesh training data 303 can include ground truth data describing a first pose and/or orientation of an entity depicted by the three-dimensional mesh 302. As such, the training data can describe any aspect of the three-dimensional mesh 302, one or more entities represented by the three-dimensional mesh 302, and/or any other aspects of the three-dimensional mesh 302.

One or more derivatives 318 can be generated for one or more respective splats of the two-dimensional rendering 314 (e.g., at occlusion boundaries, etc.). More particularly, one or more derivatives 318 can be generated based at least in part on weight(s) of one or more respective splats of the two-dimensional differentiable rendering 314 with regards the vertex positions using the automatic differentiation function 316.

The two-dimensional differentiable rendering 314 of the three-dimensional mesh 302 can be processed with a machine-learned model 316 to generate a machine-learned output 318 (e.g., a depiction of the mesh 302 at a second pose/orientation, a second three-dimensional mesh, a mesh fitting, a pose estimation, etc.).

A loss function 320 can be evaluated that evaluates a difference between the machine-learned output 318 and the training data 303 associated with the three-dimensional mesh 302. As an example, the machine-learned output 318 can be evaluated (e.g., with the loss function 320, etc.) using, at least in part, a gradient descent algorithm to determine a difference between the machine-learned output 318 and the training data 303 associated with the three-dimensional mesh 302 (e.g., a ground truth associated with the three-dimensional mesh 302, etc.). Based on the loss function 320, one or more parameters of the machine-learned model 316 can be adjusted via parameter adjustment(s) 322. As an example, the machine-learned output 318 can be generated by the machine-learned model 326, and the loss function 320 can be used to evaluate the differences between the machine-learned output 318 and the ground truth (e.g., training data 303) associated with the generated three-dimensional mesh 302 and to generate parameter adjustment(s) 322 to optimize the machine-learned model 316.

As an example, the machine-learned model 316 can be or otherwise include a machine-learned pose estimation model 316, and the machine-learned output 318 can include image data that depicts an entity represented by the three-dimensional mesh 302 (e.g., an object, at least a portion of a human body, a surface, etc.). The machine-learned output 318 can be image data (e.g., a three-dimensional mesh, a two-dimensional differentiable rendering, etc.) that depicts the entity with at least one of a second pose or second orientation that are different than a first pose and/or orientation of the entity (e.g., as represented by the three-dimensional mesh, etc.).

Example Methods

Figure 4:
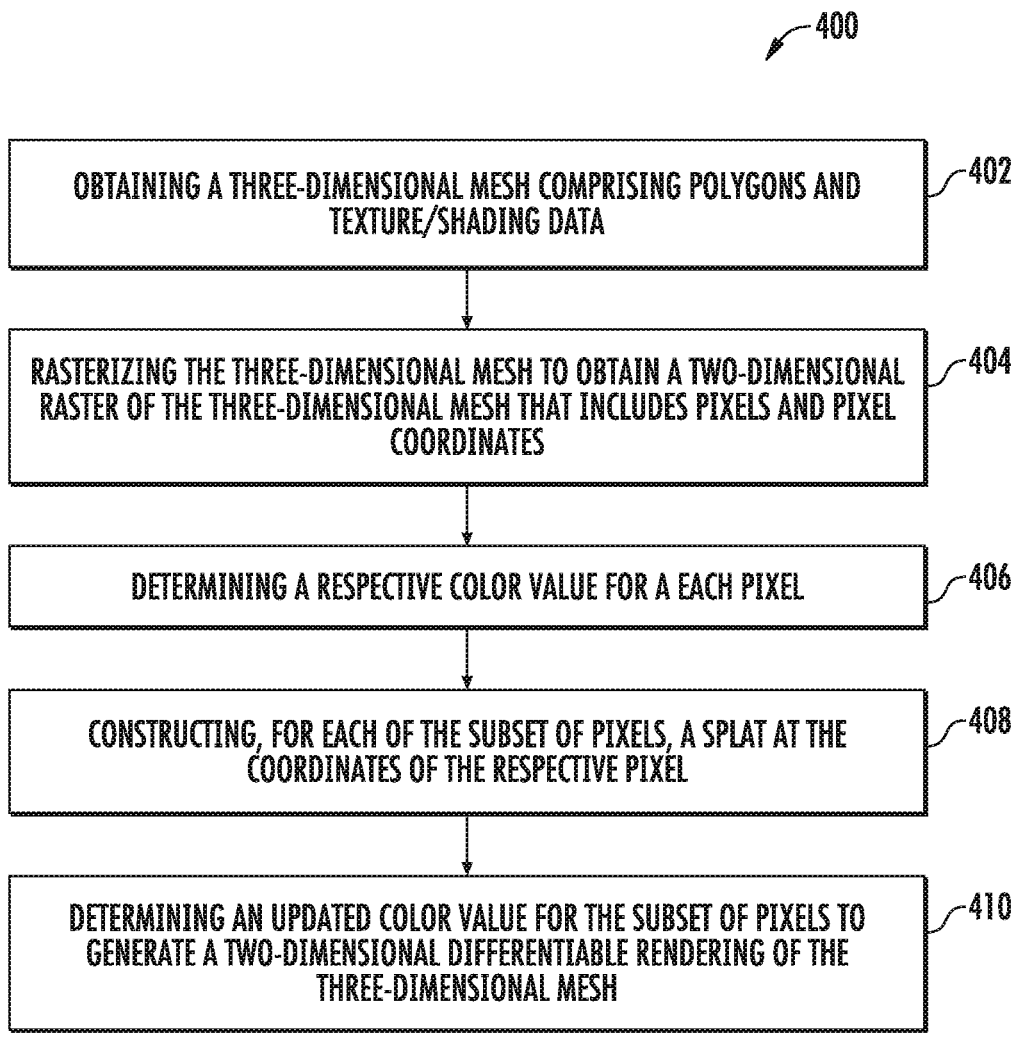
FIG. 4 depicts a flow chart diagram of an example method to generate a two-dimensional differentiable rendering according to example embodiments of the present disclosure.

FIG. 4 depicts a flow chart diagram of an example method 400 to generate a two-dimensional differentiable rendering according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can obtain a three-dimensional mesh comprising a plurality of polygons and associated texture and/or shading data. As an example, the three-dimensional mesh can be a mesh representation of an object, and the associated shading and/or texture data can indicate a one or more colors for the polygons of the three-dimensional mesh (e.g., a texture data for a character model mesh in a video game, etc.). In some implementations, the three-dimensional mesh can be generated using one or more machine-learning techniques. As an example, the three-dimensional mesh may be generated by a machine-learned model based on a two-dimensional input. For example, a machine-learned model can process a two-dimensional image of a cup and can output a three-dimensional mesh representation of the cup.

As another example, the three-dimensional mesh can represent pose and/or orientation adjustments to a first three-dimensional mesh. For example, a machine-learned model can process a first three-dimensional mesh at a first pose and/or orientation and obtain a second three-dimensional mesh at a second pose and/or orientation different from the first. Thus, the three-dimensional mesh and the associated texture/shading data can, in some implementations, be an output of a machine-learned model, and as such, the capacity to generate smooth derivatives for a rendering of the three-dimensional mesh (e.g., at occlusion boundaries, etc.) can be necessary to optimize the machine-learned model used to generate the three-dimensional mesh.

At 404, the computing system can rasterize the three-dimensional mesh to obtain a two-dimensional raster of the three-dimensional mesh. The two-dimensional raster can be or otherwise include a plurality of pixels and a plurality of coordinates respectively associated with a subset of the plurality of pixels (e.g., by sampling the surface of the three-dimensional mesh, etc.). These coordinates can describe the locations of pixels relative to the vertices of the polygons in which the pixels are located. As an example, a first coordinate can describe a location of a first pixel relative to the vertices of a first polygon in which the first pixel is located. A second coordinate can describe a location of a second pixel relative to the vertices of a second polygon in which the second pixel is located. In some implementations, each of the plurality of coordinates can be or otherwise include barycentric coordinates.

In some implementations, the two-dimensional raster can also include a plurality of polygon identifiers for each of the subset of pixels. The polygon identifiers can be configured to identify, for each pixel, one or more polygons that a respective pixel is located within. As an example, a pixel can be located within two or more overlapping polygons of the plurality of polygons (e.g., as the polygons of the three-dimensional mesh are represented in two dimensions, etc.). The polygon identifier for the pixel would identify that the pixel is located within both polygons. Additionally, in some implementations, the polygon identifier can identify a front-facing polygon when a pixel is located within two or more overlapping polygons. As an example, the three-dimensional mesh can represent a cube. A pixel of the two-dimensional raster of the three-dimensional mesh can be located inside a polygon of a first side of the cube and a non-visible (e.g., from two dimensions) polygon on an opposite side of the cube. The polygon identifier can indicate that the polygon on the first side of the cube is the front-facing polygon. In such fashion, the polygon identifier can be utilized to ensure that a color applied to the pixel is associated with the polygon facing the viewpoint of the two-dimensional raster.

It should be noted that the computing system can rasterize the three-dimensional mesh to obtain the two-dimensional raster using any type of rasterization scheme. As an example, the two-dimensional raster (e.g., the plurality of coordinates, the polygon identifiers, etc.) may be obtained using a conventional z-buffer graphics processing (e.g., depth buffering, etc.). As another example, the two-dimensional raster (e.g., the plurality of coordinates, the polygon identifiers, etc.) may be obtained using a three-dimensional raycasting procedure. As such, embodiments of the present disclosure can be utilized in a rendering and/or rasterization pipeline without requiring the use of a non-standard or unique rasterization scheme.

At 406, the computing system can determine an initial color value for each pixel of the subset of pixels. The initial color value can be based on the coordinates of the pixel and the associated shading data and/or the associated texture data. As an example, the polygon coordinates for a first pixel can indicate that the first pixel is located in a first polygon. Based on the shading and/or texture data, the polygon can be determined to have an orange color where the pixel is located (e.g., with respect to the polygon's vertices, etc.). The first pixel can be colored orange based on the pixel coordinates and the shading and/or texture data.

More particularly, in some implementations, the polygon identifier and coordinates for each pixel can allow for perspective-correct interpolation of vertex attributes (e.g., of the polygons of the three-dimensional mesh, etc.) to determine a color for the pixel. In some implementations, the determination of the color for each pixel can include application of the shading data and/or the texture data to the two-dimensional raster using a shading and/or texturing scheme. For either application, any sort of application scheme can be used. As an example, a deferred-shading, image-space application scheme can be used to apply the shading data and/or the texture data to determine a color for each of the subset of pixels.

At 408, the computing system can construct a splat for each pixel of the subset of pixels at the coordinates of each of the respective pixels. More particularly, each rasterized surface point of the two-dimensional raster can be converted into a splat, centered at the coordinates of the respective pixel, and colored by the corresponding shaded color C that was determined for the pixel. To preserve derivatives for the vertices of the polygons of the three-dimensional mesh, the coordinates at which the splats are constructed (e.g., splat center points, etc.) can be computed by interpolating clip-space vertex positions for the polygon in which a respective pixel is located based at least in part on the coordinates associated with the pixel (e.g., x, y, z, w homogeneous coordinates, barycentric coordinates, etc.). As an example, a h×w×4 buffer of per-pixel clip-space positions V can be formed for each pixel. Perspective division and a viewport transformation can be applied to the buffer to produce a h×w×2 screen-space splat position buffer S. For example, if s is a position of a single splat, the weight of the splat at a pixel p in the image is:

$$w_s(p) = \frac{1}{W}\exp\left(\frac{-\|p-s\|_2^2}{2\sigma^2}\right)$$

where W normalizes by the sum of all weights for the splat (see below). The final color $r_p$ at pixel p can then represent the weighted sum of the shaded colors $c_q$ of the neighboring pixels $q \in N_p$.

At 410, the computing system can determine an updated color value for each of the subset of pixels to generate a two-dimensional differentiable rendering of the three-dimensional mesh. The updated color value can be based on a weighting of a subset of the constructed splats. The weighting of the respective splats in the subset of splats for a pixel can be based at least in part on the coordinates of the respective pixel and the coordinates of the respective splat. As an example, a first pixel can have a determined color of yellow. Coordinates of a second pixel can be located a certain distance away from the first pixel, and a third pixel can be located an even further distance from the first pixel. The application of the first pixel splat (e.g., constructed at the coordinates of the first pixel, etc.) to the second pixel can be weighted more heavily than the application of the first pixel splat to the third pixel, as the second pixel is located closer to the first pixel than the third pixel is. As such, the weighting of the subset of splats in the determination of an updated color value for a pixel can be based on the proximity of each of the splats to the pixel. By determining the updated color values for each of the subset of splats, a differentiable two-dimensional rendering of the three-dimensional mesh can be generated. As such, the differentiable two-dimensional rendering (e.g., generated through application of the splats, etc.) can be utilized to find smooth derivatives at occlusion boundaries of the rendering.

It should be noted that the subset of splats can, in some implementations, include fewer splats than the number of constructed splats. Additionally, in some implementations, a subset of splats can be selected uniquely for each pixel of the subset of pixels. As an example, the subset of splats for a pixel can include only the splats constructed for pixels adjacent to the pixel. As another example, the subset of splats for a pixel can include only the splats constructed for pixels within a certain distance or area of the pixel (e.g., a 5×5 pixel area around the pixel, a certain distance as defined by pixel coordinates, etc.). Alternatively, in some implementations, the subset of splats can include each of the splats constructed for the subset of pixels. As an example, for the determination of an updated color value for a single pixel, each of the splats constructed can be weighed (e.g., a normalized weight from 0.0-1.0, etc.). For example, each splat can be weighed for a pixel based on the distance of the splat from the pixel, and splats closest to the pixel can be weighed most heavily while splats furthest from the pixel can be weighed the least.

As an example, s can be the position of a single splat. P can be a pixel in the two-dimensional raster. The weight of the splat at a pixel p in the two-dimensional raster can be defined as:

$$w_s(p) = \frac{1}{W} \exp\left(\frac{-\|p - s\|_2^2}{2\sigma^2}\right)$$

where W can be normalized by the sum of all weights for the splat (see below). The updated color value $r_p$ for pixel p can be the weighted sum of the shaded initial color values $c_q$ of the neighboring pixels $q \in N_p$:

$$r_p = \sum_{q \in N_p} w_q(p) c_q$$

As described previously, in some implementations a subset of neighboring (e.g., adjacent, a certain distance away, etc.) can be used. For example, a 3×3 pixel neighborhood can be used with σ=0.5, which can yield the normalization factor:

$$W = \sum_{i=-1}^{1} \sum_{j=-1}^{1} \exp(-2\|\lfloor s \rfloor + (i, j) - s\|_2^2)$$

Figure 5:
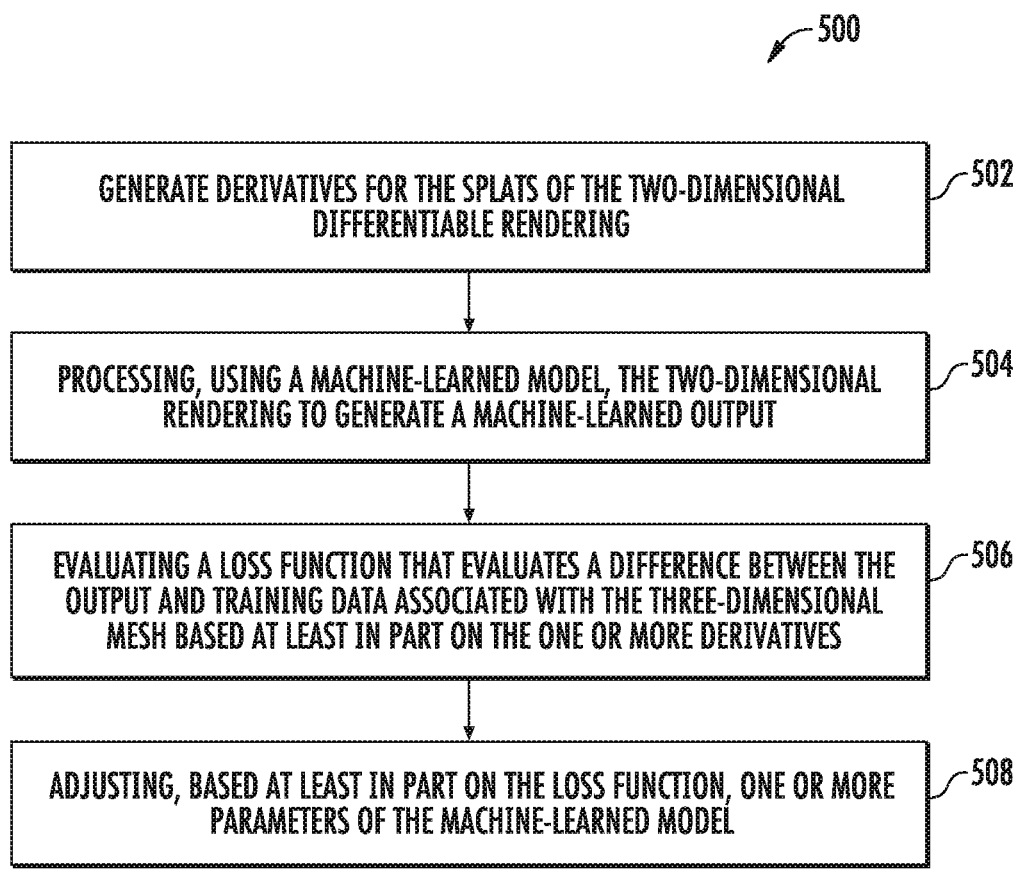
FIG. 5 depicts a flow chart diagram of an example method to generate derivatives at occlusion boundaries of a two-dimensional differentiable rendering to train a machine-learned model according to example embodiments of the present disclosure.

FIG. 5 depicts a flow chart diagram of an example method 500 to generate derivatives at occlusion boundaries of a two-dimensional differentiable rendering to train a machine-learned model according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can generate, based on a two-dimensional differentiable rendering, one or more derivatives for one or more respective splats of the two-dimensional rendering (e.g., at occlusion boundaries, etc.). More particularly, one or more derivatives can, be generated for the weight(s) of one or more splats of the two-dimensional differentiable rendering with regards the vertex positions (e.g., using an automatic differentiation function, etc.). The two-dimensional differentiable rendering can be generated as described previously with regards to FIG. 4.

At 504, the computing system can process two-dimensional differentiable rendering of the three-dimensional mesh with a machine-learned model to generate a machine-learned output (e.g., a depiction of the mesh at a second pose/orientation, a second three-dimensional mesh, a mesh fitting, a pose estimation, etc.).

At 506, the computing system can evaluate a loss function that evaluates a difference between the machine-learned output and training data associated with the three-dimensional mesh based at least in part on the one or more derivatives. As an example, using a gradient descent algorithm, the one or more derivatives can be evaluated to determine a difference between the machine-learned output and the training data associated with the three-dimensional mesh (e.g., a ground truth associated with the three-dimensional mesh, etc.). Based on the loss function, one or more parameters of a machine-learned model can be adjusted.

As an example, the machine-learned model can be or otherwise include a machine-learned pose estimation model, and the machine-learned output can include image data that depicts an entity represented by the three-dimensional mesh (e.g., an object, at least a portion of a human body, a surface, etc.). The machine-learned output can be image data (e.g., a three-dimensional mesh, a two-dimensional differentiable rendering, etc.) that depicts the entity with at least one of a second pose or second orientation that are different than a first pose and/or orientation of the entity (e.g., as represented by the three-dimensional mesh, etc.).

As another example, the machine-learned model can be a machine-learned three-dimensional mesh generation model (e.g., a model configured to fit a mesh to a depicted entity, generate a mesh from two-dimensional image data, etc.). The machine-learned model can process the two-dimensional differentiable rendering to generate a second three-dimensional mesh. In such fashion, the two-dimensional differentiable rendering can allow for training of any type or configuration of machine-learned model(s) through differentiation of the machine-learned output of the model(s).

At 508, the computing system can adjust one or more parameters of a machine-learned model based at least in part on the loss function (e.g., the evaluation of the loss function, etc.).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for generating a differentiable two-dimensional rendering of a three-dimensional model, the method comprising:
    obtaining, by a computing system comprising one or more computing devices, a three-dimensional mesh comprising a plurality of polygons and at least one of associated texture data or associated shading data;
    rasterizing, by the computing system, the three-dimensional mesh to obtain a two-dimensional raster of the three-dimensional mesh, wherein the two-dimensional raster comprises a plurality of pixels and a plurality of coordinates respectively associated with at least a subset of pixels of the plurality of pixels, wherein the coordinates for each pixel in the subset of pixels describe a location of the respective pixel relative to vertices of a respective polygon of the plurality of polygons in which the pixel is located;
    determining, by the computing system, a respective initial color value for each pixel of the subset of pixels based at least in part on the coordinates of the pixel and the at least one of the associated shading data or the associated texture data;
    constructing, by the computing system for each of the subset of pixels, a splat at the coordinates of the respective pixel; and
    determining, by the computing system for each of the subset of pixels, an updated color value for the respective pixel based on a weighting of each of a subset of the splats to generate a two-dimensional differentiable rendering of the three-dimensional mesh, wherein, for each of the subset of the splats, the weighting of the respective splat is based at least in part on the coordinates of the respective pixel and the coordinates of the respective splat.

2. The computer-implemented method of claim 1, wherein the method further comprises generating, by the one computing system based on the two-dimensional differentiable rendering, one or more derivatives of one or more respective splats of the two-dimensional differentiable rendering.

3. The computer-implemented method of claim 2, wherein the one or more derivatives are generated using an automatic differentiation function.

4. The computer-implemented method of claim 2, wherein:
    each of the one or more derivatives is generated based on the respective coordinates of the one or more pixels that the one or more splats are constructed for; and
    the coordinates of each pixel of the subset of pixels comprise one or more barycentric coordinates.

5. The computer-implemented method of claim 2, wherein the method further comprises:
    processing, by the computing system using a machine-learned model, the two-dimensional rendering to generate a machine-learned output;
    evaluating, by the computing system, a loss function that evaluates a difference between the output and training data associated with the three-dimensional mesh based at least in part on the one or more derivatives; and
    adjusting, by the computing system based at least in part on the loss function, one or more parameters of the machine-learned model.

6. The computer-implemented method of claim 5, wherein:
    the two-dimensional rendering depicts an entity represented by the three-dimensional mesh
    the training data comprises ground truth data describing at least one of a first pose or a first orientation of the entity;
    the machine-learned output comprises image data depicting the entity with at least one of a second pose or a second orientation different than the first pose or the first orientation; and
    the machine-learned model comprises a machine-learned pose estimation model.

7. The computer-implemented method of claim 5, wherein:
    the machine-learned model comprises a machine-learned three-dimensional mesh generation model;
    the machine-learned output comprises a second three-dimensional mesh based at least in part on the two-dimensional rendering; and
    the training data comprises ground truth data associated with the three-dimensional mesh.

8. The computer-implemented method of claim 6, wherein the three-dimensional mesh comprises a mesh representation of:
    an object;
    at least a portion of a human body; or
    a surface.

9. The computer-implemented method of claim 5, wherein the machine-learned output is evaluated by the loss function based at least in part on a gradient descent algorithm.

10. The computer-implemented method of claim 1, wherein:
the two-dimensional raster further comprises a respective subset of polygon identifiers, wherein each of the respective subset of polygon identifiers is configured to identify, for each of the subset of pixels, one or more polygons the respective pixel is located within; and
the initial color value of each pixel of the subset of pixels is based at least in part on the polygon identifier of the respective pixel.

11. The computer-implemented method of claim 10, wherein:
the pixel is located within two or more overlapping polygons of the plurality of polygons; and
the polygon identifier is configured to identify a front-facing polygon of the two or more overlapping polygons.

12. The computer-implemented method of claim 1, wherein, for each of the subset of the splats, the coordinates of the respective splat are adjacent to the coordinates of the respective pixel.

13. A computing system for generating a differentiable two-dimensional rendering of a three-dimensional model, comprising:
one or more processors; and
one or more tangible, non-transitory computer readable media storing computer-readable instructions that when executed by the one or more processors cause the one or more processors to perform operations, the operations comprising:
obtaining a three-dimensional mesh comprising a plurality of polygons and at least one of associated texture data or associated shading data;
rasterizing the three-dimensional mesh to obtain a two-dimensional raster of the three-dimensional mesh, wherein the two-dimensional raster comprises a plurality of pixels and a plurality of coordinates respectively associated with at least a subset of pixels of the plurality of pixels, wherein the coordinates for each pixel in the subset of pixels describe a location of the respective pixel relative to vertices of a respective polygon of the plurality of polygons in which the pixel is located;
determining a respective initial color value for each pixel of the subset of pixels based at least in part on the coordinates of the pixel and the at least one of the associated shading data or the associated texture data;
constructing, for each of the subset of pixels, a splat at the coordinates of the respective pixel; and
determining, for each of the subset of pixels, an updated color value for the respective pixel based on a weighting of each of a subset of the splats to generate a two-dimensional differentiable rendering of the three-dimensional mesh, wherein, for each of the subset of the splats, the weighting of the respective splat is based at least in part on the coordinates of the respective pixel and the coordinates of the respective splat.

14. The computing system of claim 13, wherein:
the operations further comprise generating, based on the two-dimensional differentiable rendering, one or more derivatives of one or more respective splats of the two-dimensional differentiable rendering;
each of the one or more derivatives is generated based on the respective coordinates of the one or more pixels that the one or more splats are constructed for; and
the coordinates of each pixel of the subset of pixels comprise one or more barycentric coordinates.

15. The computing system of claim 13, wherein the operations further comprise:
processing, using a machine-learned model, the two-dimensional rendering to generate a machine-learned output;
evaluating a loss function that evaluates a difference between the output and training data associated with the three-dimensional mesh based at least in part on the one or more derivatives; and
adjusting, based at least in part on the loss function, one or more parameters of the machine-learned model.

16. The computing system of claim 13, wherein:
the two-dimensional rendering depicts an entity represented by the three-dimensional mesh
the training data comprises ground truth data describing at least one of a first pose or a first orientation of the entity;
the machine-learned output comprises image data depicting the entity with at least one of a second pose or a second orientation different than the first pose or the first orientation; and
the machine-learned model comprises a machine-learned pose estimation model.

17. The computing system of claim 16, wherein the three-dimensional mesh comprises a mesh representation of:
an object;
at least a portion of a human body; or
a surface.

18. The computing system of claim 13, wherein:
the machine-learned model comprises a machine-learned three-dimensional mesh generation model;
the machine-learned output comprises a second three-dimensional mesh based at least in part on the two-dimensional rendering; and
the training data comprises ground truth data associated with the three-dimensional mesh.

19. The computing system of claim 13, wherein:
the two-dimensional raster further comprises a respective subset of polygon identifiers, wherein each of the respective subset of polygon identifiers is configured to identify, for each of the subset of pixels, one or more polygons the respective pixel is located within; and
the initial color value of each pixel of the subset of pixels is based at least in part on the polygon identifier of the respective pixel.

20. One or more tangible, non-transitory computer readable media storing computer-readable instructions that when executed by one or more processors cause the one or more processors to perform operations, the operations comprising:
obtaining a three-dimensional mesh comprising a plurality of polygons and at least one of associated texture data or associated shading data;
rasterizing the three-dimensional mesh to obtain a two-dimensional raster of the three-dimensional mesh, wherein the two-dimensional raster comprises a plurality of pixels and a plurality of coordinates respectively associated with at least a subset of pixels of the plurality of pixels, wherein the coordinates for each pixel in the subset of pixels describe a location of the respective pixel relative to vertices of a respective polygon of the plurality of polygons in which the pixel is located;
determining a respective initial color value for each pixel of the subset of pixels based at least in part on the coordinates of the pixel and the at least one of the associated shading data or the associated texture data;
constructing, for each of the subset of pixels, a splat at the coordinates of the respective pixel; and
determining, for each of the subset of pixels, an updated color value for the respective pixel based on a weighting of each of a subset of the splats to generate a two-dimensional differentiable rendering of the three-dimensional mesh, wherein, for each of the subset of the splats, the weighting of the respective splat is based at least in part on the coordinates of the respective pixel and the coordinates of the respective splat.

\* \* \* \* \*